Oct. 4, 1960

C. H. SORRICK 2,954,962

KINKING ATTACHMENT FOR TIRE SPREADERS

Filed Dec. 30, 1958

INVENTOR.
Clay H. Sorrick
BY
Webster & Webster
ATTYS.

Oct. 4, 1960 C. H. SORRICK 2,954,962
KINKING ATTACHMENT FOR TIRE SPREADERS
Filed Dec. 30, 1958 2 Sheets-Sheet 2

INVENTOR.
Clay H. Sorrick
BY
Webster & Webster
ATTYS.

United States Patent Office 2,954,962
Patented Oct. 4, 1960

2,954,962
KINKING ATTACHMENT FOR TIRE SPREADERS

Clay H. Sorrick, Orinda, Calif., assignor to Super Mold Corporation of California, Lodi, Calif., a corporation of California Filed Dec. 30, 1958, Ser. No. 783,791

4 Claims. (Cl. 254—50.3)

This invention relates in general to the tire retreading industry, and in particular is directed to an attachment adapted for use in connection with a tire spreader, for relatively separating the beads of a tire, as shown—for example—in co-pending application Serial No. 662,629, filed May 31, 1957.

With such a tire spreader the beads of a tire—prepared for tread vulcanization—are engaged and spread apart in order to temporarily reduce the diameter of the tire so that it may be inserted into an endless or band-type retreading mold from one side thereof. When the beads are spread apart far enough to reduce the diameter of the tire sufficiently for entry into the mold, such tire must obviously kink or buckle inwardly somewhat, since the actual circumferential extent of the tread remains unchanged by the bead spreading operation.

With a conventional and relatively pliable tire, the construction thereof is such that the kinks occur at a number of points and are spaced more or less evenly about the circumference of the tire when the beads are spaced apart.

However, in at least one other type of tire, and which is very stiff, only a single kink will of itself form when the tire beads are spread apart, and consequently an insufficient reduction of the tire diameter is obtained, which prevents the tire from being inserted into the mold. Up to the present time the necessary number of kinks, and the relatively even circumferential distribution thereof in such other type of tire, has been effected by striking the tread—of the spread tire—with a rubber-head hammer or the like at spaced points about said tire.

It is, therefore, the principal object of this invention to provide an attachment, for a tire spreader, which—in conjunction with the bead spreading operation of the latter—will cause the occurrence of a plurality of kinks in the tire, and in circumferentially spaced relation thereabout, even though the tire be of stiff construction, and on which such kinks would not otherwise occur.

Another object of the invention is to provide a kinking attachment, for a tire spreader, which is arranged so that no damage will be done to the new tread rubber or camelback—of the tire prepared for tread vulcanization—when the tire is spread and the desired kinking action is being effected on the spread tire by said attachment.

A further object of the invention is to provide a kinking attachment, for a tire spreader, which is comprised of members which may be easily and quickly applied to, or removed from, said tire spreader, as well as readily adjusted to the size of any tire being spread.

It is also an object of the invention to provide a kinking attachment, for a tire spreader, which is designed for ease and economy of manufacture, and convenience of use.

These objects are accomplished by means of such structure and relative arrangement of parts as will fully appear by a perusal of the following specification and claims.

Figure 1:
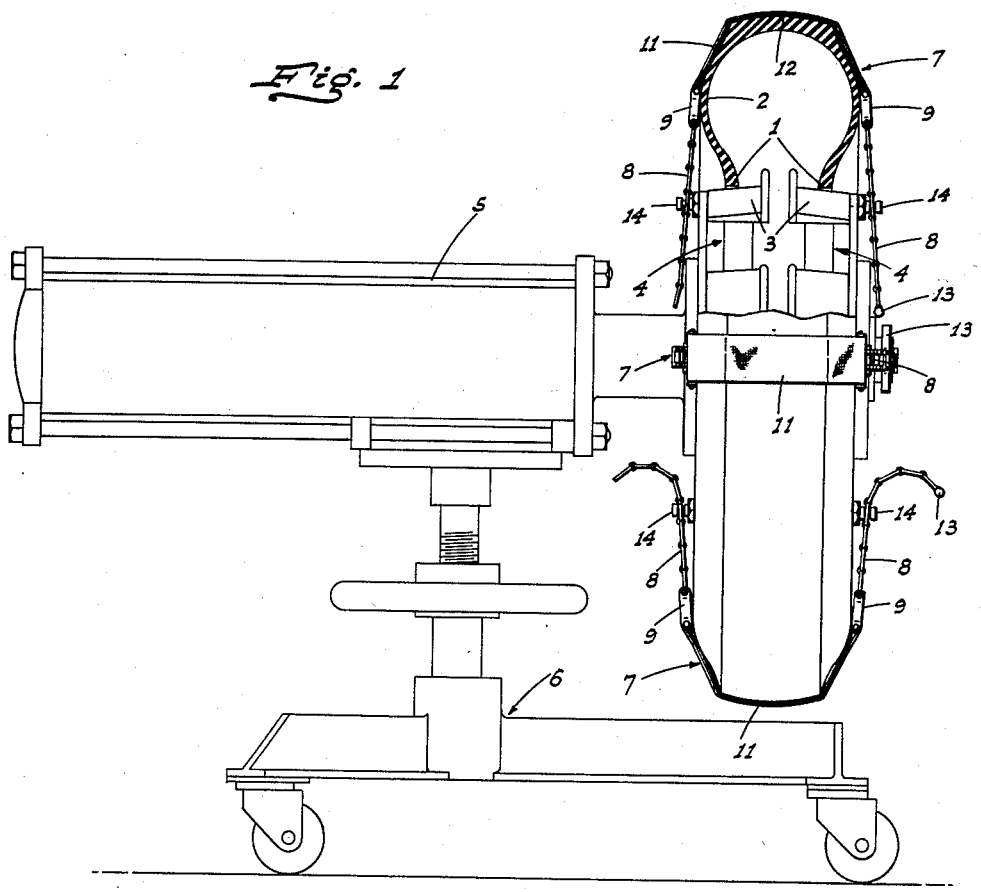
Fig. 1 is a side elevation of the tire spreader and kinking attachment as applied to a tire, and before the spreading and kinking action is obtained; the tire being shown partly in section.

Referring now more particularly to the drawings, and to the characters of reference marked thereon, the beads 1 of tire 2 to be spread and kinked, are mounted on the segmental bead engaging jaws 3 of axially separable chuck units 4 which are preferably the same as shown in co-pending application Serial No. 763,914, filed September 29, 1958.

The chuck units are supported on the relatively movable parts of a horizontally disposed hydraulic ram 5, as shown in hereinbefore identified co-pending application Serial No. 662,629, filed May 31, 1957; the ram being mounted on a mobile base 6 also as shown in said application.

When the jaws 3, and the tire beads engaged thereby, are moved axially apart, the diameter of the tire is reduced, and at the same time a radially inward kinking or depression of the tread portion of the tire, as well as of the adjacent sidewall portions, takes place. In order that such kinking shall occur at evenly spaced intervals in the circumference of the tire, as is desirable, a kinking attachment—comprising a number of separate members functioning in conjunction with the movement of the chuck units 4—is employed.

Each member of the kinking attachment, and of which there are as many as there are chuck jaws (preferably four), is denoted generally at 7, and comprises alined but separated lengths of chain 8, of flat type having links with openings therein. At their adjacent ends, said chains 8 are provided with relatively wide yokes 9; the outer ends of which straddle and are connected by cross pins 10 to the ends of a correspondingly wide non-elastic but flexible fabric strap 11. The length of each strap 11 is at least as great as the combined width of the tread 12 of the tire and the adjacent sidewall portions thereof, as shown in Fig. 1.

One of the chains 8, at its outer end, is provided with a relatively wide cross rod 13 which serves as a pull handle.

Each chuck jaw 3, centrally of its ends and on its laterally outer side, is provided with a headed pin or stud 14, disposed parallel to the axis of the chuck and of a size to pass through any one of the chain openings 15.

In operation, the tire to be spread and kinked, preparatory to insertion in a vulcanizing mold, is first mounted on the jaws 3 of the chuck units 4 of the spreader. Before such chuck units 4 are separated, the kinking members 7 are successively disposed across the tire and connected to the related chuck units under as much tension as is manually possible. This is done, after substantially centering the strap 11 transversely on the tire, by engaging one chain 8 with the adjacent pin 14, and then pulling on the handle rod 13 to draw the kinking member taut, and so that the opposite pin 14 may be projected through the nearest possible opening 15 in the other chain 8, as illustrated in Fig. 1. As so mounted, the kinking members 7 are circumferentially spaced about the tire.

Figure 2:
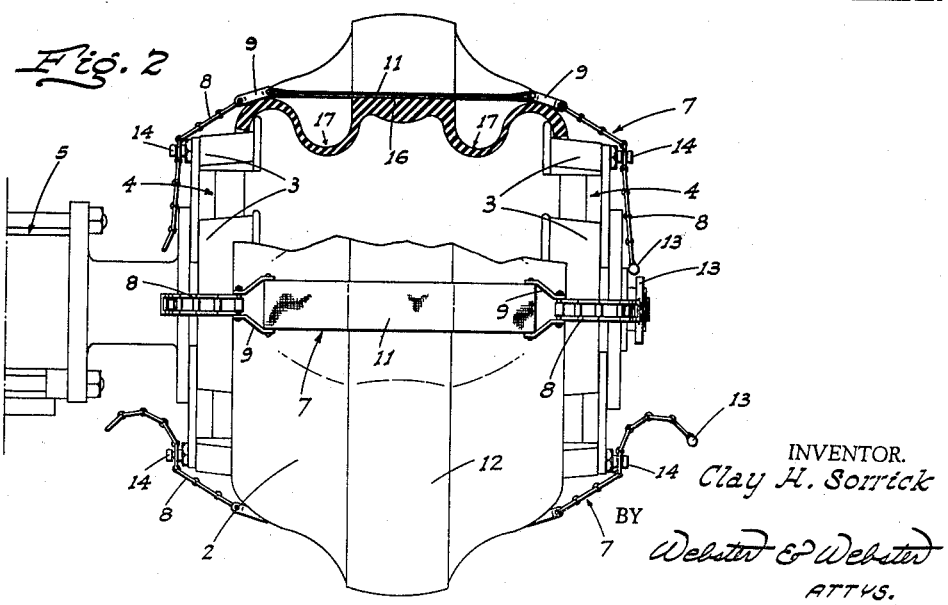
Fig. 2 is a fragmentary side elevation of the tire spreader and kinking attachment, showing the tire as spread and kinked; the tire being shown partly in section.
Figure 3:
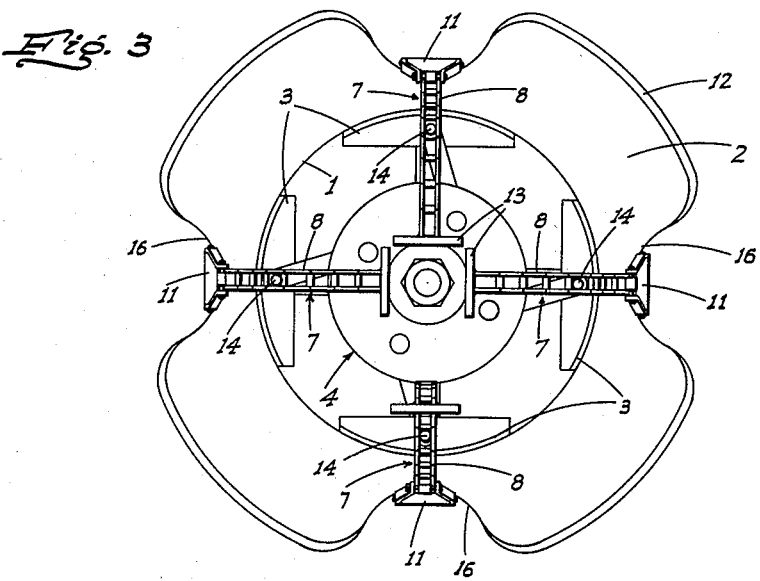
Fig. 3 is a front elevation of the tire spreader and kinking attachment, showing the tire as kinked.
Figure 4:
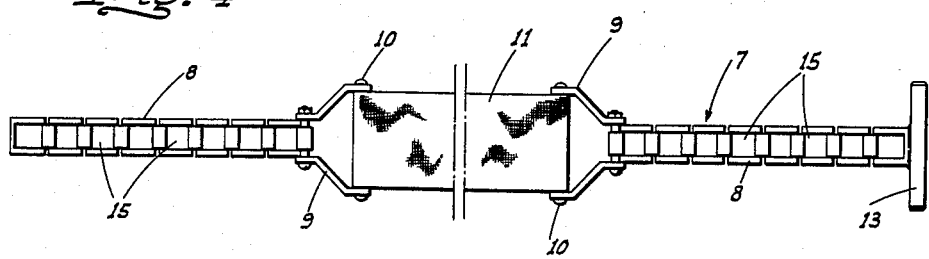
Fig. 4 is a forehortened plan view of one of the kinking members, detached.
Figure 5:
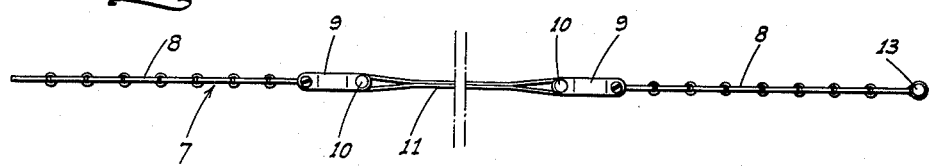
Fig. 5 is a foreshortened edge view of such kinking member.

Thereafter, upon relatively moving the chuck units apart, the opposed pins 14 are likewise moved apart. When this occurs, the kinking members 7, connected to said pins, tend to assume a straight-across position therebetween, so that the tread of the tire is pressed radially inward, or kinked where engaged by the straps 11, as at 16, while the adjacent sidewall portions assume a bowed-in position as shown at 17 in Fig. 2.

When the kinks have been thus firmly established in the tire, and before the tire spreading action is completed, the kinking members 7 may be removed. This is done by first pulling down on the handle 13 of each member 7 in turn, so that the adjacent chain 8 may be disengaged from the related pin 14. The member 7 then becomes slack, so that the opposite chain 8 may be disengaged from the corresponding pin 14 and said member removed from the tire and chuck units.

The spreading of the tire may then be completed, since the kinks—after having been once created—will then maintain themselves without a further restraining action thereon.

The tread engaging straps 11 of kinking members 7 are made of wide, relatively smooth, and flexible fabric so that there is no danger of the soft uncured rubber or camelback on the tire tread being damaged by the pressing contact of the straps 11 therewith when the described kinking attachment is in use.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A device for kinking the tread of a tire at circumferentially spaced points while the tire is being spread by a tire spreader having axially separable bead engaging jaws, comprising a plurality of circumferentially spaced flexible members arranged adjacent their ends for detachable connection with the tire bead-engaging jaws of the tire spreader and straddling the tire in substantially taut engagement with the tread; the central tread engaging portion of each member being a substantially smooth-surfaced fabric strap.

2. In combination, a tire spreader which includes opposed elements to engage the beads of a tire and relatively movable in opposite directions to spread the beads apart whereby the diameter of the tire is reduced; non-extensible members adapted to straddle the tire in relatively taut engagement with the tread thereof at circumferentially spaced points, each member comprising alined but separated lengths of chain, a relatively wide strap of fabric disposed between the chains and of a length greater than the width of the tread of the tire, and yokes connecting the strap ends to the adjacent ends of the chains; and pins projecting laterally out from said opposed elements and of a size to removably engage in an adjacent and corresponding chain.

3. A combination, as in claim 2, in which one chain of each member is provided at the outer end with a transverse handle.

4. In combination, a tire spreader which includes transversely opposed elements to engage the beads of a tire from the inside and pull such beads apart whereby to reduce the tread diameter of the tire; and a tire kinking attachment which includes a non-extensible elongated flexible member to straddle and overlie the tire from the outside, and means to connect said member at its end portions to the spreader outwardly of the tire and laterally out from and in the radial plane of the spreader elements for lateral movement of said end portions therewith and arranged to maintain said member in relatively taut engagement with the tread of the tire before the beads thereof are spread.

References Cited in the file of this patent
UNITED STATES PATENTS

| | | |
|---|---|---|
| 2,525,114 | Branick | Oct. 10, 1950 |
| 2,727,718 | Branick | Dec. 20, 1955 |
| 2,919,892 | Hawkinson | Jan. 5, 1960 |